United States Patent
Sato

(10) Patent No.: US 7,352,277 B2
(45) Date of Patent: Apr. 1, 2008

(54) ANTENNA FOR TIRE PRESSURE INFORMATION SENDING APPARATUS AND TIRE PRESSURE INFORMATION SENDING APPARATUS USING THE SAME

(75) Inventor: Akinori Sato, Kyoto (JP)

(73) Assignee: Kyocera Corporation, Kyoto (JP)

( * ) Notice: Subject to any disclaimer, the term of this patent is extended or adjusted under 35 U.S.C. 154(b) by 163 days.

(21) Appl. No.: 11/059,190

(22) Filed: Feb. 16, 2005

(65) Prior Publication Data

US 2005/0179529 A1  Aug. 18, 2005

(30) Foreign Application Priority Data

Feb. 17, 2004 (JP) ............................ P2004-040491
Jan. 7, 2005 (JP) ............................ P2005-002878

(51) Int. Cl.
*B60C 23/00* (2006.01)
(52) U.S. Cl. .................. 340/447; 340/442; 340/572.7; 340/572.8
(58) Field of Classification Search ................... None
See application file for complete search history.

(56) References Cited

U.S. PATENT DOCUMENTS

| | | | | |
|---|---|---|---|---|
| 3,872,455 A | * | 3/1975 | Fuller et al. | ........... 340/870.05 |
| 5,952,972 A | * | 9/1999 | Ittipiboon et al. | ... 343/700 MS |
| 5,987,337 A | * | 11/1999 | Takaya | ........................ 455/572 |
| 6,474,380 B1 | * | 11/2002 | Rensel et al. | ............ 152/152.1 |
| 6,933,898 B2 | * | 8/2005 | Nantz et al. | ................. 343/711 |
| 7,009,506 B2 | * | 3/2006 | Wilson et al. | ............... 340/445 |
| 7,104,298 B2 | * | 9/2006 | Starinshak | ................ 152/152.1 |
| 2003/0164799 A1 | | 9/2003 | Nantz et al. | |
| 2006/0109182 A1 | * | 5/2006 | Rosenberg et al. | ......... 343/702 |

FOREIGN PATENT DOCUMENTS

| | | |
|---|---|---|
| JP | 2000-332626 | 11/2000 |
| JP | 2003-006592 | 1/2003 |
| JP | 2003-294869 | 10/2003 |
| JP | 2003-347811 | 12/2003 |

OTHER PUBLICATIONS

Chinese language office action and its English translation for corresponding Chinese application No. 200510009060.0 lists the reference above.

* cited by examiner

*Primary Examiner*—Benjamin C. Lee
*Assistant Examiner*—Son Tang
(74) *Attorney, Agent, or Firm*—Hogan & Hartson LLP

(57) ABSTRACT

An antenna 1 for a tire pressure information sending apparatus is constituted by a circuit board provided with feeding electrodes and a radiation electrode 8 having a loop surface substantially perpendicular to the principal surface, the radiation electrode sending air pressure information of a tire onto a principal surface of the circuit board by radio waves. Thereby, when the apparatus is mounted on a wheel rim, a magnetic field vector parallel to the principal surface of the circuit board and parallel to the wheel rim is generated, and a direction of a magnetic field vector by a mirror effect to the wheel rim becomes the same as the direction of the magnetic field vector of the antenna. As a result, it is possible to effectively prevent that the antenna characteristic deteriorates.

15 Claims, 12 Drawing Sheets

ANTENNA FOR TIRE PRESSURE INFORMATION SENDING APPARATUS AND TIRE PRESSURE INFORMATION SENDING APPARATUS USING THE SAME

BACKGROUND OF THE INVENTION

1. Field of the Invention

The present invention relates to an antenna for a tire pressure information sending apparatus which detects air pressure of a tire and receives/sends information on the tire pressure by radio waves, to a tire pressure information sending apparatus provided with the antenna, and a wheel with the tire pressure information sending apparatus.

2. Description of the Related Art

For safe running of a vehicle, it has become regarded as important to keep air pressure of a tire appropriate, and development working for establishment of regulations that make it obligatory to install an apparatus for monitoring air pressure of a tire in a vehicle has been advanced mainly in Europe and America.

A tire pressure information sending apparatus as described above is provided on a tire side with a pressure sensor that detects air pressure of the tire, and a sending circuit and an antenna that send by radio waves information on the air pressure of the tire detected by the pressure sensor, and on a vehicle side, with a receiving antenna that receives the radio waves, and a receiving unit that informs a driver driving the vehicle of the pressure information.

Japanese Unexamined Patent Publication No. JP-A 2003-347811 proposes that a loop antenna 18 having a radiation electrode having a loop surface at a space of 2 mm above a principal surface 4a of a circuit board 4 on which the sending circuit is mounted as shown in FIG. 8A as an antenna that sends the air pressure information from the tire pressure information sending apparatus is used and the circuit board 4 on which the loop antenna 18 is packaged is attached onto a wheel rim. As shown in FIG. 8B, on the assumption that a direction of an electric current that flows along the loop antenna 18 is expressed by a vector, a loop surface 9 formed by the vector is disposed so as to be in parallel to the circuit board 4. Thereby, it is possible to efficiently propagate radio waves radiated in a tire hollow region.

A tire pressure information sending apparatus is attached to a tire and used in an environment of high-speed rotation. Accordingly it is desired that it is as small in size and light in weight as possible. On the other hand, it is desirable that the antenna is large in order to send radio waves with high efficiency. In general, as an antenna becomes small in size, radiation efficiency of the antenna lowers. To such conflicting demands, it is necessary to make an optimum design in terms of strength and electricity.

The conventional antenna for the air pressure information sending apparatus as shown in FIG. 8A is strong in terms of strength as the loop antenna 18 has a low-profile structure. As shown in FIG. 8B, in the case of showing the direction of the electric current that flows along the loop antenna 18 with the vector and showing a normal direction of the loop surface 9 formed by the vector with a dot-line vector, the normal direction of the loop surface 9 substantially coincides with a normal direction of the circuit board 4, that is, the loop surface 9 is substantially parallel to the circuit board 4. Thereby, an induction electric current generated to the wheel rim for placing the circuit board 4 on which the antenna 18 is mounted is generated in the opposite direction to the electric current that flows along the loop antenna 18. Therefore, radiation radio waves such that the induction electric current of the wheel rim offsets the radio waves radiated by the loop antenna 18 are generated. Consequently, there is a problem such that a radiation resistance becomes significantly small.

SUMMARY OF THE INVENTION

An object of the invention is to provide an antenna for a tire pressure information sending apparatus capable of effectively preventing antenna characteristics from deteriorating, a tire pressure information sending apparatus provided with the antenna for a tire pressure information sending apparatus, and a wheel with the tire pressure information sending apparatus.

The invention provides an antenna for a tire pressure information sending apparatus comprising a circuit board provided with feeding electrodes, and a radiation electrode placed on a principal surface of the circuit board, having a loop surface substantially perpendicular to the principal surface, the radiation electrode sending air pressure information of a tire by radio waves.

Further, in the invention, it is preferable that a dielectric substance or a magnetic substance is disposed within the loop surface.

Furthermore, in the invention, it is preferable that a battery cell is attached within the loop surface.

Still further, the invention provides a tire pressure information sending apparatus comprising any one of the antennas for the tire pressure information sending apparatus mentioned above, further comprising, on the circuit board, a pressure sensor for detecting the air pressure information of the tire, the antenna being attached to the tire pressure information sending apparatus so that the loop surface is substantially perpendicular to a wheel rim of the tire.

Still further, in the invention, it is preferable that one end of the radiation electrode is used as a grounding conductor or a power source conductor.

Still further, the invention provides a tire pressure information sending apparatus comprising, a circuit board, a pressure sensor placed on the circuit board, for detecting air pressure of a tire, a sending circuit placed on the circuit board, for sending information on the air pressure detected by the pressure sensor by radio waves, and a radiation electrode placed on the circuit board, for sending the radio waves, the radiation electrode having a loop surface substantially perpendicular to a principal surface of the circuit board.

In the invention, it is preferable that the pressure sensor and the sending circuit are arranged within the loop surface.

Still further, the invention provides a wheel with the tire pressure information sending apparatus attached thereto so that the loop surface is substantially perpendicular to a principal surface of a conductor portion of the wheel to which the tire is attached.

According to the invention, the antenna for the tire pressure information sending apparatus comprises a circuit board provided with feeding electrodes, and a radiation electrode placed on a principal surface of the circuit board, having a loop surface substantially perpendicular to the principal surface, the radiation electrode sending air pressure information of a tire by radio waves. Accordingly, a magnetic field vector that is parallel to the principal surface of the circuit board and parallel to the wheel rim made of metal or the like is generated, a direction of a magnetic field vector by a mirror effect to the wheel rim becomes the same as that of the antenna, and consequently, it is possible to effectively prevent that antenna characteristics deteriorate when the antenna is attached to the wheel rim.

Further, according to the invention, when the dielectric substance or the magnetic substance is disposed within the loop surface, it is possible to make the radiation electrode small in size because of a wavelength reduction effect by the dielectric substance, and it is possible to make the antenna small in size. Moreover, when the magnetic substance is disposed within the loop surface, it is possible to reduce a conductor loss by the radiation electrode and increase radiation efficiency of the antenna because the magnetic substance makes impedance high.

Furthermore, according to the invention, when the battery cell is attached within the loop surface in each of the above configurations, it is possible to use a metallic case of the battery cell as part of the radiation electrode, so that it is possible to effectively use a space, and consequently, it is possible to make a loop cross section of the antenna large, and it is possible to improve the antenna characteristics.

Still further, according to the invention, the tire pressure information sending apparatus that uses the antenna for the tire pressure information sending apparatus is provided with the pressure sensor for detecting the air pressure information of the tire on the circuit board, and the antenna is attached to the tire pressure information sending apparatus so that the loop surface is substantially perpendicular to the wheel rim of the tire. Therefore, it is possible to send and receive the air pressure information more accurately by using the antenna whose antenna characteristics do not deteriorate.

Still further, according to the invention, when the one end of the radiation electrode is used as the grounding conductor or the power source conductor, it is possible to make the apparatus smaller in size by using it as part of the antenna.

Still further, according to the invention, the tire pressure information sending apparatus comprises, on the circuit board, the pressure sensor for detecting the air pressure of the tire, the sending circuit for sending the information on the air pressure detected by the pressure sensor by radio waves, and the radiation electrode for sending the radio waves, and the radiation electrode has the loop surface substantially perpendicular to the principal surface of the circuit board. Therefore, it is possible to form the radiation electrode into a wide plate-like shape, and consequently, it is possible to make a conductor resistance of the radiation electrode small, and it is possible to enhance the radiation efficiency of the antenna.

Furthermore, according to the invention, it is possible to make the apparatus smaller in size by arranging the pressure sensor and the sending circuit within the loop surface.

According to the invention, with respect to the wheel with the tire pressure information sending apparatus, the tire pressure information sending apparatus of the invention having the above configuration is attached to the wheel so that the loop surface is substantially perpendicular to the principal surface of the conductor portion of the wheel to which the tire is attached. Thereby, the magnetic field vector generated by the loop-shaped radiation electrode becomes substantially parallel to the principal surface of the conductor portion of the wheel, and therefore, the direction of the magnetic field vector by the mirror effect to the conductor portion of the wheel becomes the same as that of the magnetic field vector by the radiation electrode. Consequently, it is possible to effectively prevent that the antenna characteristics deteriorate at the time of attachment to the wheel.

BRIEF DESCRIPTION OF THE DRAWINGS

Other and further objects, features, and advantages of the invention will be more explicit from the following detailed description taken with reference to the drawings wherein.

DETAILED DESCRIPTION

Below, an antenna for a tire pressure information sending apparatus and a tire pressure information sending apparatus using the same of the invention will be described in detail by the use of the drawings.

Figure 1A:
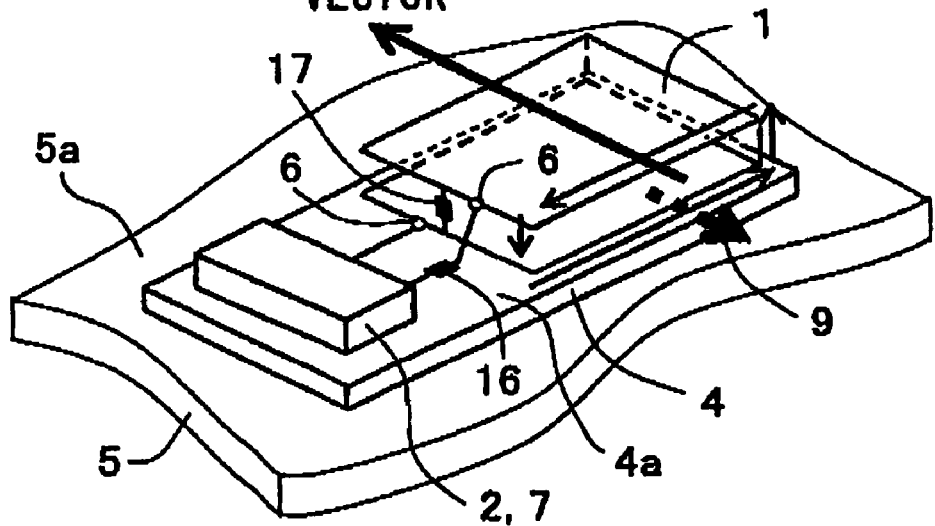
FIG. 1A is a perspective view showing a tire pressure information sending apparatus according to a first embodiment of the invention.
Figure 1B:
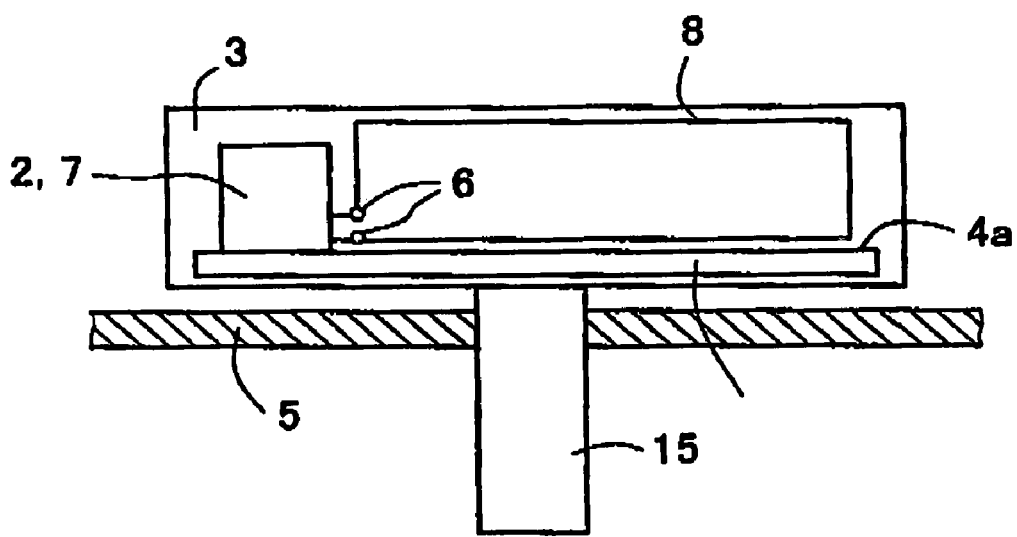
FIG. 1B is a side view of FIG. 1A.

FIG. 1A and 1B are views showing a tire pressure information sending apparatus according to a first embodiment of the invention, FIG. 1A is a perspective view, and FIG. 1B a side view thereof.

As shown in FIG. 1A and 1B, the tire pressure information sending apparatus of the invention comprises a case 3, a circuit board 4 placed on the case 3, a pressure sensor 2, a sending circuit 7, and a radiation electrode 8. The pressure sensor 2 is placed on a principal surface 4a of the circuit board 4 for detecting air pressure information of a tire. The sending circuit 7 is placed on the principal surface 4a of the circuit board 4, and sends the air pressure information detected by the pressure sensor 2 by radio waves. The radiation electrode 8 is placed on the principal surface 4a of the circuit board 4, and is fed with high-frequency signals outputted from the sending circuit 7 by feeding electrodes 6. An antenna 1 for the tire pressure information sending apparatus (simply referred to as the antenna hereafter) is formed by the radiation electrode 8 and the circuit board 4 provided with the feeding electrodes 6. The high-frequency signals sent from the antenna 1 is received with a receiving antenna disposed on the side of a vehicle, and a driver in the vehicle is informed of the pressure information.

A frequently used frequency of the high-frequency signals fed to the antenna 1 by the sending circuit 7 and sent is 315 MHz or 433 MHz.

Here, it is important that the antenna 1 for the tire pressure information sending apparatus of the invention comprises the circuit board 4 provided with the feeding electrodes 6, and the radiation electrode 8 having a loop surface 9 substantially perpendicular to the principal surface 4a, the radiation electrode sending the air pressure information of the tire onto the principal surface 4a of the circuit board 4 by the radio waves.

At first, when directions of an electric current that flows along the radiation electrode 8 are shown by vectors in FIG. 1A, the loop surface 9 in the antenna 1 of the invention is a surface formed by the vectors. In addition, when a normal direction of the loop surface 9 is shown by a dot-line vector, the normal direction of the loop surface 9 is a direction forming an angle of approximately 90 degrees with a normal direction of the circuit board 4. That is, the radiation electrode 8 has the loop surface 9 substantially perpendicular to the principal surface 4a of the circuit board 4, and the antenna 1 is formed by a so-called loop antenna.

The radiation electrode 8 having the loop surface 9 substantially perpendicular to the principal surface 4a of the circuit board 4 is provided as described above. Accordingly, when the tire pressure information sending apparatus is attached to a placement surface 5a of a wheel rim 5, the loop surface 9 becomes substantially perpendicular to the placement surface 5a of the wheel rim 5. Thereby, a magnetic field vector that is parallel to the principal surface 4a of the circuit board 4 and parallel to the placement surface 5a of the wheel rim 5 is generated in a direction of an arrow, and a direction of a magnetic field vector by a mirror effect to the wheel rim 5 becomes the same as that of the magnetic field vector of the radiation electrode 8. Therefore, it is possible to obtain the antenna 1 such that antenna characteristics do not deteriorate when the tire pressure information sending apparatus is attached to the wheel rim 5 via an attaching member 15.

Moreover, the loop surface 9 substantially perpendicular to the principal surface 4a of the circuit board 4 of the radiation electrode 8 means a surface that does not need to make a circuit necessarily, but is formed so as to face at least three directions of four directions that surround the circuit board 4, such as an angular U-letter shape or a rounded U-letter shape, and it is enough that the loop surface 9 and the principal surface 4a of the circuit board 4 are substantially perpendicular to each other, that is, an angle formed by the two surfaces is within a range of 80 to 100 degrees.

Moreover, the radiation electrode 8 is made of phosphor bronze or the like, the two feeding electrodes 6 thereof are connected to the sending circuit 7, respectively, and balanced feed from the sending circuit 7 to the radiation electrode 8 is carried out.

Figure 2:
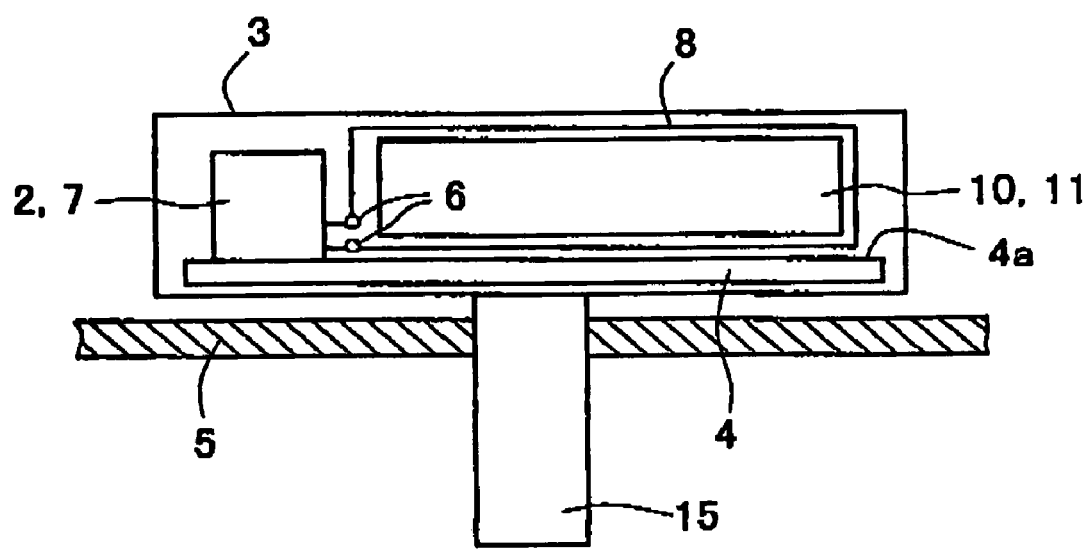
FIG. 2 is a side view showing a tire pressure information sending apparatus according to a second embodiment of the invention.

FIG. 2 is a side view showing a tire pressure information sending apparatus according to a second embodiment of the invention. Furthermore, it is preferable to dispose a dielectric substance 10 or a magnetic substance 11 within the loop surface 9 as shown in a side view of FIG. 2.

Consequently, it is possible to make the antenna 1 small in size. For more detail, it is possible to make the antenna 1 small in size by a wavelength shortening effect that a velocity of radio waves becomes proportion to a square root of a dielectric constant by the use of the dielectric substance 10 though an electric field component in the loop surface 9 is small in the radiation electrode 8 of the antenna 1. In the case of using the magnetic substance 11, since magnetic flux in the loop-shaped radiation electrode is intensified in proportion to magnetic permeability, as a result of increase of the impedance of the antenna and decrease of a flowing electric current, a conductor loss by the radiation electrode is reduced. Consequently, radiation efficiency of the antenna 1 is enhanced.

Moreover, it is possible to use a silicon resin and ceramics such as alumina as the dielectric substance 10, and it is possible to use NiZn, MnZn and the like as the magnetic substance 11.

Moreover, it is possible to place the dielectric substance 10 or the magnetic substance 11 on the circuit board 4 by mounting with solder, for example.

Figure 3:
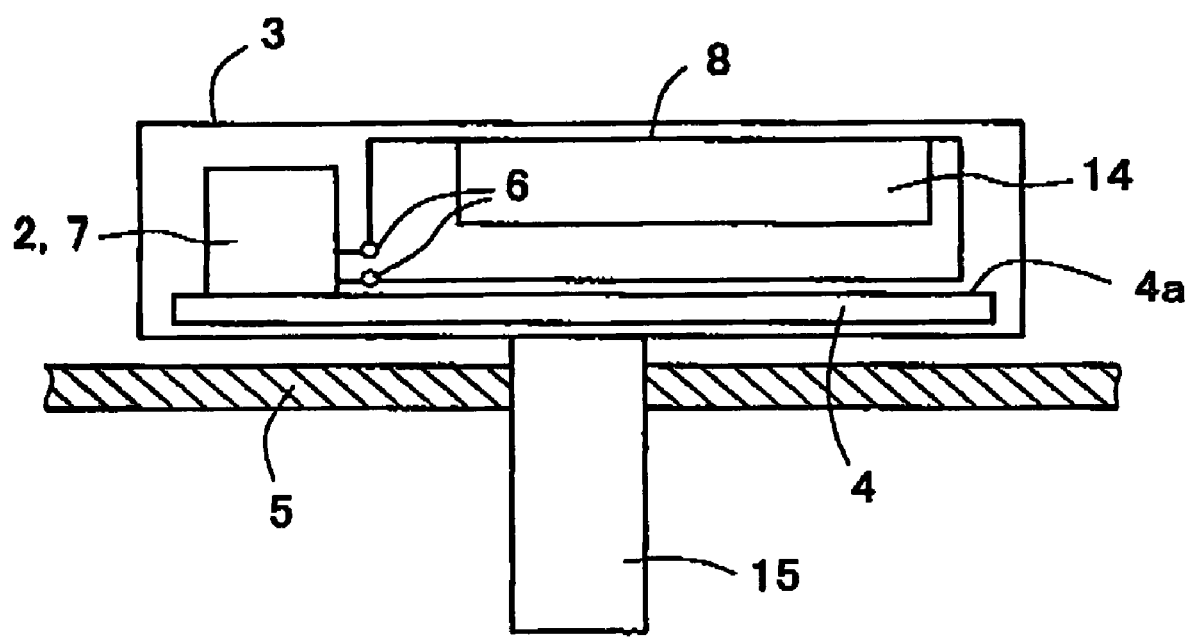
FIG. 3 is a side view showing a tire pressure information sending apparatus according to a third embodiment of the invention.

FIG. 3 is a side view showing a tire pressure information sending apparatus according to a third embodiment of the invention. Still further, a battery cell 14 for driving the sending circuit 7 is attached within the loop surface 9 as shown in a side view of FIG. 3. Therefore, it is possible to use a metallic case of the battery cell 14 as part of the radiation electrode 8, so that it is possible to make the surface area of the radiation electrode 8 substantially larger while keeping the antenna 1 itself small in size, and it is possible to improve the antenna characteristics. A direct current power source for driving the sending circuit 7 and a grounding conductor, regarding the high-frequency signals flowing along the antenna 1, can interrupt high frequency component by the use of a high-frequency interrupting element such as an inductance, and transmit a direct current component.

Figure 4:
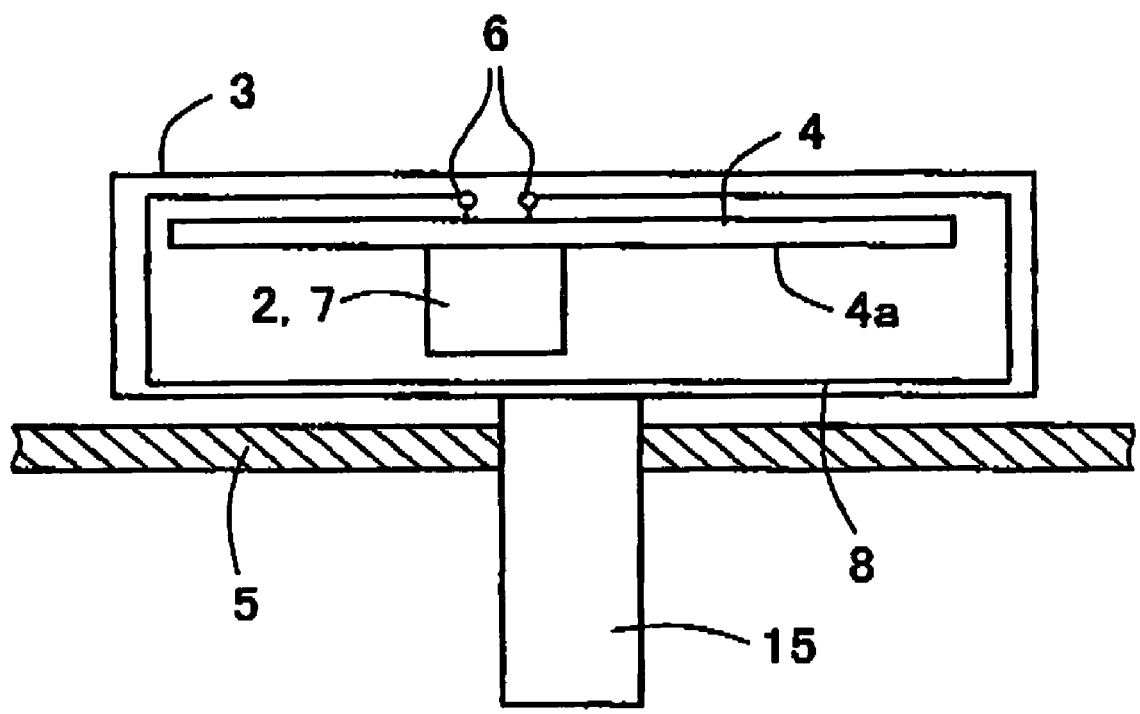
FIG. 4 is a side view showing a tire pressure information sending apparatus according to a fourth embodiment of the invention.

FIG. 4 is a side view showing a tire pressure information sending apparatus according to a fourth embodiment of the invention. Still further, it is also possible to make the apparatus smaller in size by arranging the pressure sensor 2 and the sending circuit 7 within the loop surface 9 formed by the radiation electrode 8 as shown in a side view of FIG. 4.

Figure 5:
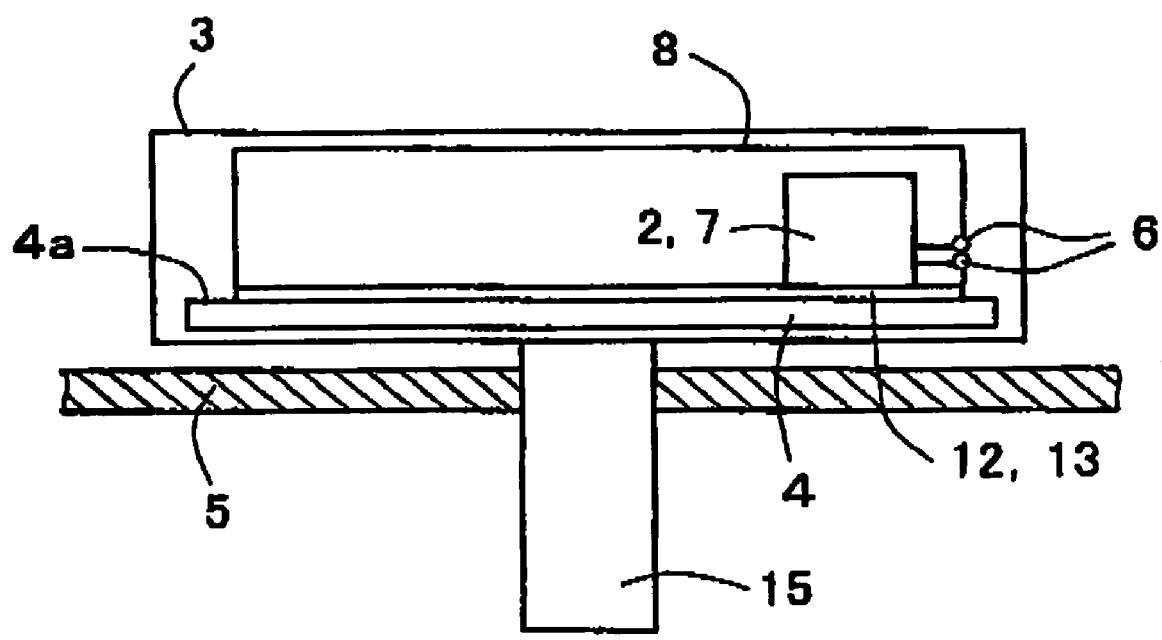
FIG. 5 is a side view showing a tire pressure information sending apparatus according to a fifth embodiment of the invention.

FIG. 5 is a side view showing a tire pressure information sending apparatus according to a fifth embodiment of the invention. Still further, it is preferable to use a grounding conductor 12 or a power source conductor 13 of the circuit board 4 as part of the radiation electrode 8 as shown in a side view of FIG. 5. Thereby, it is possible to further simplify and downsize the configuration of the antenna 1. In general, a wide conductor is used as the grounding conductor and the power source conductor. By connecting the conductors by a capacitance of 50 pF or more, the grounding conductor and the power source conductor are separate conductors with respect to the direct current power source for driving the pressure sensor 2 and the sending circuit 7, but the grounding conductor and the power source conductor can regard as a single conductor connected with respect to high frequency signals to be sent.

Figure 6A:
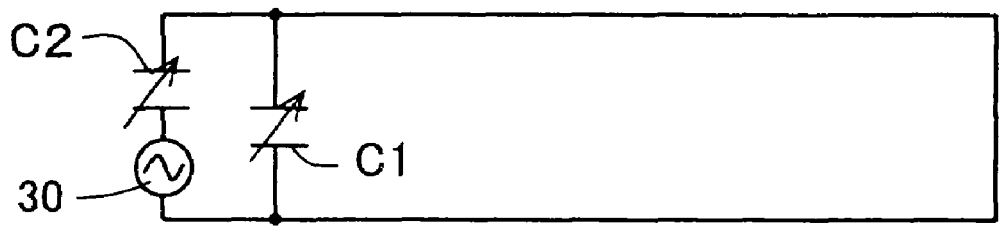
FIGS. 6A to 6C are equivalent circuit views each showing a matching circuit and a frequency regulating circuit that are used in the tire pressure information sending apparatus of the invention.
Figure 6B:
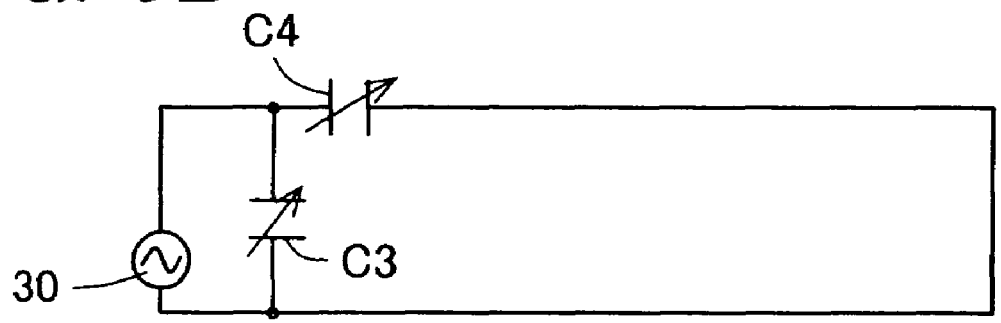
Figure 6C:
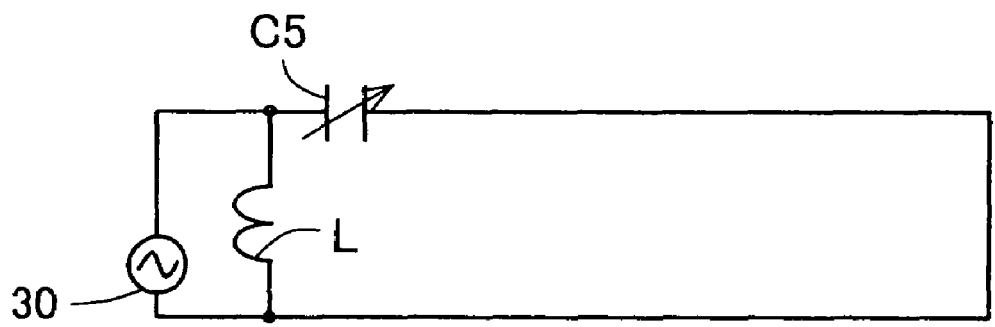

FIGS. 6A to 6C are equivalent circuit views showing a matching circuit and a frequency regulating circuit that are used in the tire pressure information sending apparatus of the invention. Besides, as a configuration of a matching circuit of a feeding portion formed on the circuit board 4 by a capacitor, an inductance and so on, three kinds as shown in FIGS. 6A to 6C can be considered. By making a capacitance of the matching circuit and a value of the inductance as variable elements, for example, variable-capacitance elements such as varactor diodes, it is possible to regulate frequency and regulate impedance. For example, in a circuit of FIG. 6A, a feed source 30 and a variable-capacitance element C2 are connected in series with each other and a variable capacitance element C1 is connected to the feed source 30 and the variable capacitance element C2 in parallel. According to such a configuration, it is possible to change an operation frequency of the antenna 1 with the variable-capacitance element C1, and it is possible to match to the impedance of the sending circuit 7 for sending out the pressure information measured by the pressure sensor 2 by radio waves with the variable-capacitance element C2. Moreover, in a circuit of FIG. 6B, the feed source 30 and a variable-capacitance element C4 are connected in series with each other, and a variable-capacitance element C3 is connected to the feed source 30 in parallel. According to such a configuration, it is possible to regulate frequency with the variable-capacitance element C4, and it is possible to regulate impedance with the variable-capacitance element C3. In FIG. 6C, the feed source 30 and a variable-capacitance element C5 are connected in series with each other, and an inductor L is connected to the feed source 30 in parallel. According to such a configuration, it is possible to regulate frequency with the variable-capacitance element C5, and it is possible to regulate impedance with the inductor L.

Such a function of regulating frequency and impedance is effective means for compensating decrease of a sent output due to a difference in environments where the tire pressure information sending apparatuses are attached, for example, a difference in materials and sizes of the wheel rims, a difference of tires and a change in temperature.

Here, a configuration "substantially perpendicular to the wheel rim" in the invention will be explained.

Although the shape of the wheel rim contains complicated curved surfaces in a cross sectional shape including a circle drawn by a wheel and a shaft, a conductor portion to which an apparatus having a length of approximately 50 mm such as the tire pressure information sending apparatus is attached can be regarded as a substantially flat surface.

Figure 9:
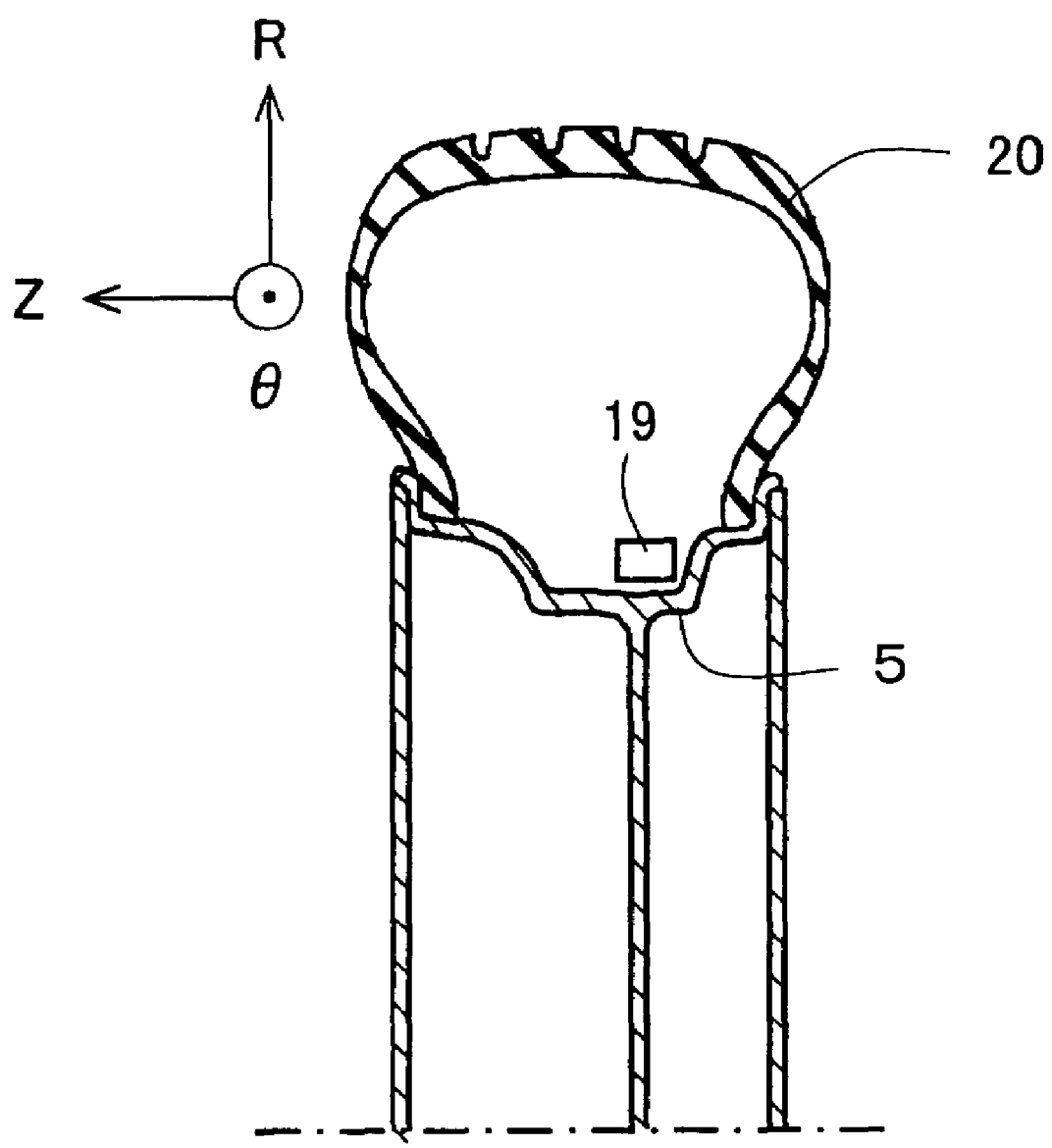
FIG. 9 is a cross sectional view showing a state where the tire pressure information sending apparatus is mounted on a wheel rim.

An explanation will be given below in concrete referring to the drawings. FIG. 9 is a cross sectional view showing a state where the tire pressure information sending apparatus is mounted on the wheel rim. More detailed mounting state is shown in a partial enlarged cross sectional view in FIG. 10. In these drawings, the wheel rim 5 has a bottom portion and a shoulder portion, and both of them have substantially flat surfaces when seen in the scale of the size of a tire pressure information sending apparatus 19.

The loop surface 9 of the radiation electrode in the tire pressure information sending apparatus 19 attached so as to be substantially perpendicular to the wheel rim 5 is set regarding the bottom portion and the shoulder portion of the wheel rim 5 as flat surfaces.

In the tire pressure information sending apparatus 19 of the invention, the plate-like radiation electrode constituting the antenna 1 forms a loop and the tire pressure information sending apparatus is attached to the wheel so that the loop surface 9 is substantially perpendicular to the wheel rim 5, more specifically, to a principal surface of the conductor portion of the wheel rim 5. Examples of the attachment will be described referring to FIGS. 10 to 13.

Figure 10:
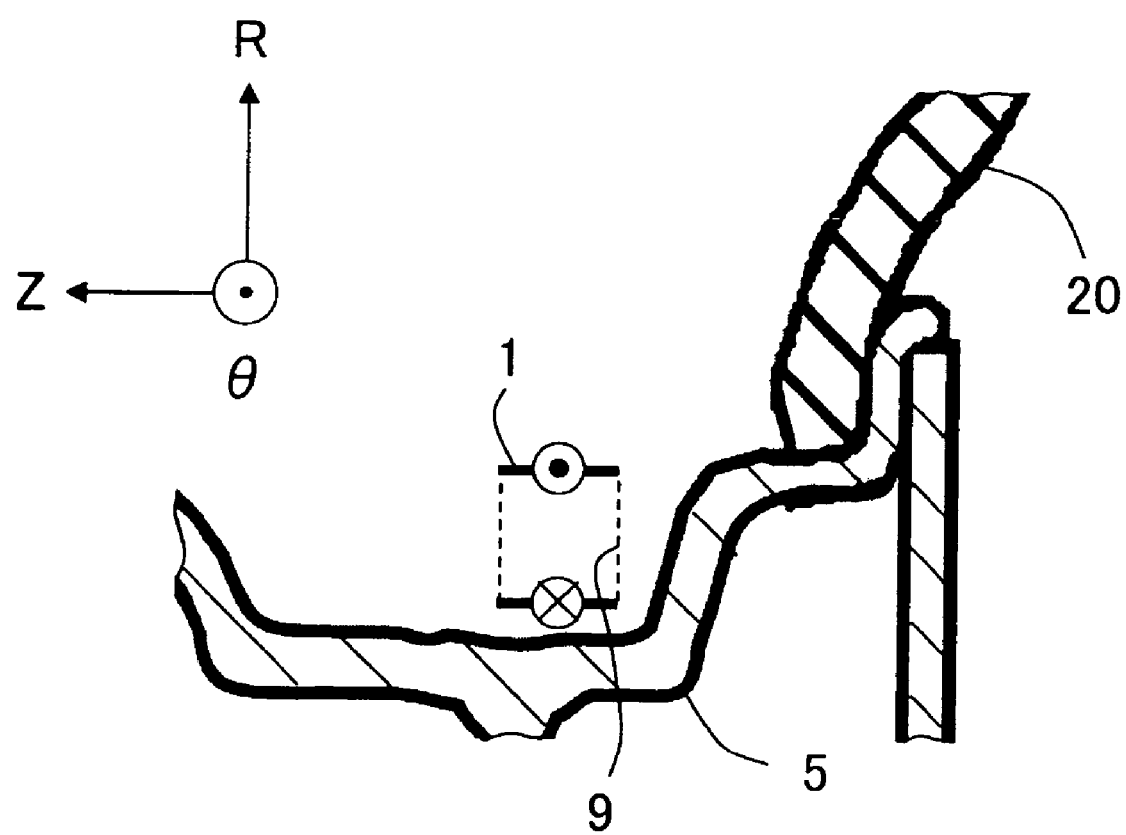
FIG. 10 is an enlarged cross sectional view showing an example that an antenna with a loop-shaped radiation electrode is placed so that an electric current returns to a r-θ plane.
Figure 11:
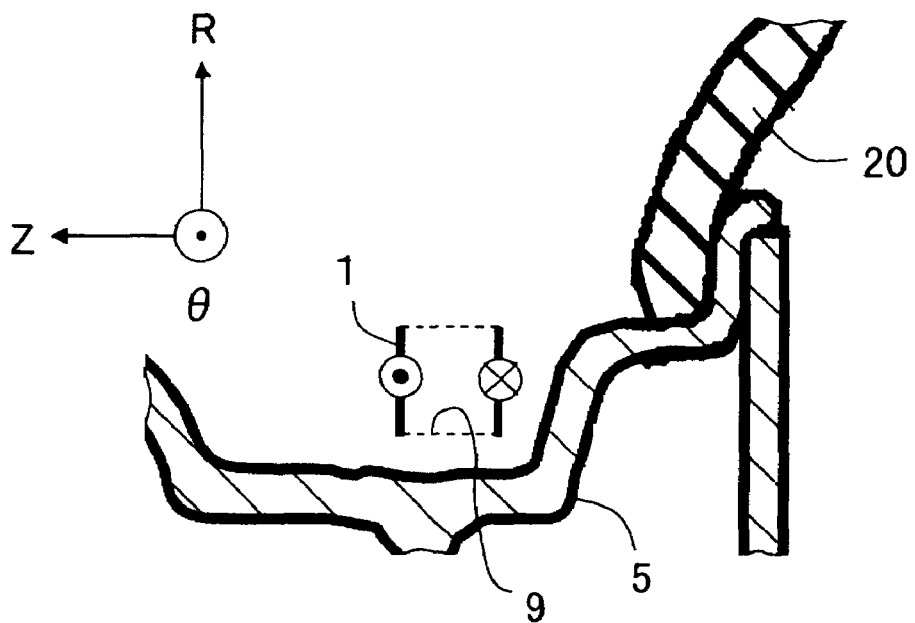
FIG. 11 is a partial enlarged cross sectional view showing another example that the antenna with the loop-shaped radiation electrode is placed so that the electric current returns to the r-θ plane.
Figure 12:
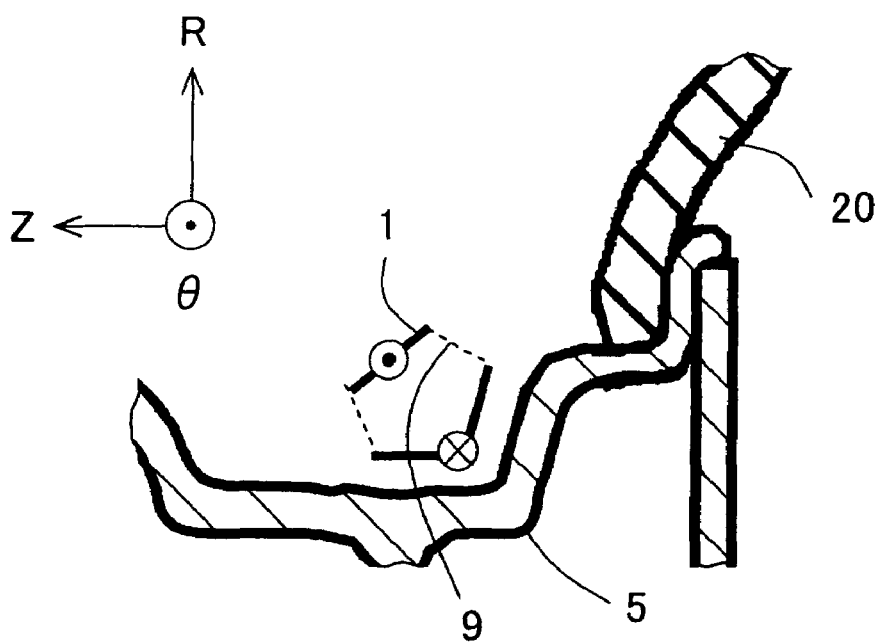
FIG. 12 is a partial enlarged cross sectional view showing still another example that the antenna with the loop-shaped radiation electrode is placed so that the electric current returns to the r-θ plane.

FIGS. 10, 11 and 12 are partial enlarged cross sectional views each showing an example that the antenna 1 with the loop-shaped radiation electrode is placed so that an electric current returns to an r-θ plane. In FIGS. 10 to 13, a symbol of a circle having a black spot therein denotes a vector in a direction from the back to the front of a paper sheet, and a symbol of a circle having a cross therein denotes a vector in a direction from the front to the back of the paper sheet.

In the example shown in FIG. 10, the loop surface 9 of the antenna 1 is perpendicular to the principal surface of the conductor portion of the bottom portion of the wheel rim 5. In this case, it is possible to make an interval between the loop-shaped radiation electrode of the antenna 1 and the bottom portion of the wheel rim 5 as small as approximately 2 mm, but it is desirable to separate approximately 8 mm or more from the shoulder portion of the wheel rim 5. This is because an influence of an electric current induced to the bottom portion of the wheel rim 5, that is, the conductor portion (normally, a metallic portion) substantially perpendicular to the loop surface 9 on the radiation efficiency is small, but an electric current induced to the shoulder portion of the wheel rim 5, that is, the conductor portion (normally, a metallic portion) substantially parallel to the loop surface 9 functions so as to offset radiation by the radiation electrode of the antenna 1.

In the example shown in FIG. 11, the loop surface 9 of the antenna 1 is perpendicular to the shoulder portion of the wheel rim 5. In this case, it is possible to make an interval between the loop-shaped radiation electrode of the antenna 1 and the shoulder portion of the wheel rim 5 as small as approximately 2 mm, but it is desirable to separate approximately 8 mm or more from the bottom portion of the wheel rim 5. This is because an influence of an electric current induced to the shoulder portion of the wheel rim 5, that is, the conductor portion (normally, a metallic portion) substantially perpendicular to the loop surface 9 on the radiation efficiency is small, but an electric current induced to the bottom portion of the wheel rim 5, that is, the conductor portion (normally, a metallic portion) substantially parallel to the loop surface 9 functions so as to offset radiation by the radiation electrode of the antenna 1.

The example shown in FIG. 12 is an example that the antenna 1 is attached to a corner portion formed by the bottom portion and the shoulder portion of the wheel rim 5. This example is an attachment example that the configurations shown in FIGS. 10 and 11 are combined.

Figure 13:
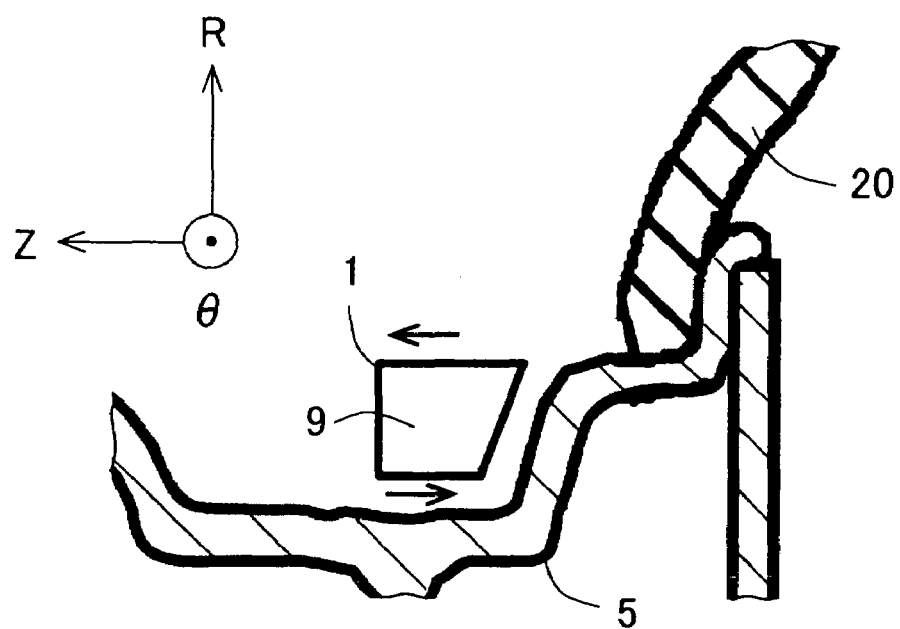
FIG. 13 is a partial enlarged cross sectional view showing an example that the antenna with the loop-shaped radiation electrode is placed so that the electric current returns to a z-r plane.

FIG. 13 is a partial enlarged cross, sectional view showing an example that the loop-shaped radiation electrode of the antenna 1 is placed so that an electric current returns to a z-r plane. In this attachment example, it is possible to configure so that the loop surface 9 of the antenna 1 is perpendicular to both the bottom portion and the shoulder portion of the wheel rim 5. In this case, it is desirable to configure so that the radiation electrode of the antenna 1 is as close as approximately 2 mm from both the bottom portion and the shoulder portion of the wheel rim 5. This is because it is possible to make the area of the loop surface 9 of the antenna 1 large while making the volume necessary for mounting the tire pressure information sending apparatus 19 small. Making the area of the loop surface 9 large has an effect of significantly improving the radiation efficiency of the antenna 1, as apparent from a description of a method for designing the loop antenna described later.

Figure 14:
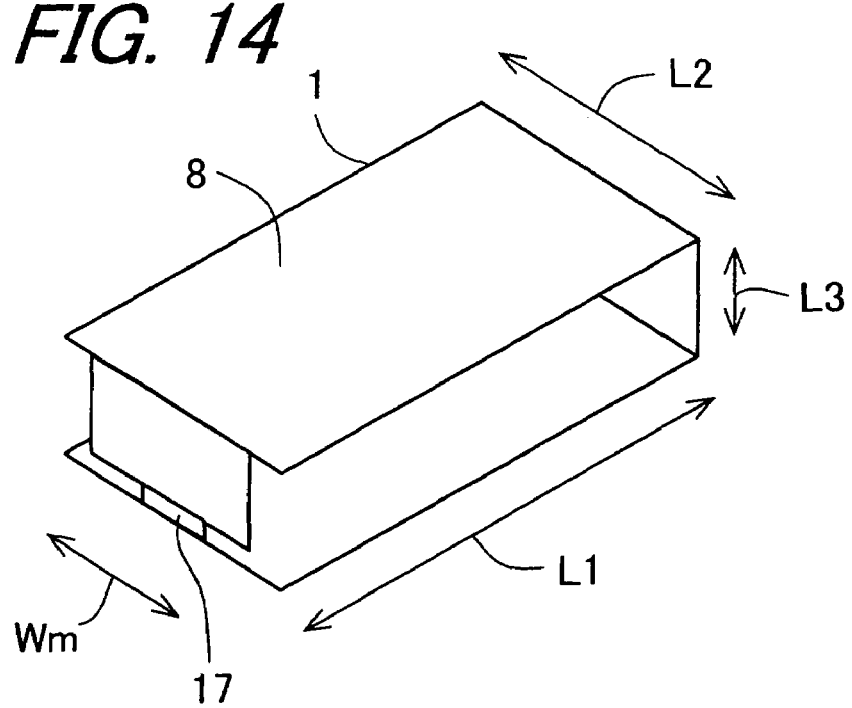
FIG. 14 is a perspective view showing an example of a loop antenna used as an antenna of a tire pressure information sending apparatus of the invention.

The method for designing the loop antenna used as the antenna 1 for the tire pressure information sending apparatus of the invention will be described. Here, the radiation efficiency of the following loop antenna will be examined. The loop antenna comprises the frequency regulating capacitance 17 and the radiation electrode having a simple shape which is formed into a rectangular shape having a length of L1, a width of L2 and a height of L3 as shown in FIG. 14 and in which the width of the electrode at a portion connected to a frequency regulating capacitance 17 in series is Wm.

Radiation efficiency η of the antenna 1 is derived from a conductor resistance and a radiation resistance Rr of an electric current that flows along the antenna 1. The conductor resistance is the sum of a resistance Rm of a portion of the radiation electrode 8 and a resistance component Rc of the frequency regulating capacitance 17. The radiation resistance is calculated by an expression shown in Expression 1 as a minute loop antenna.

$$Rr = 320 \times \left(\frac{\pi}{\lambda}\right)^4 \times (L1 \times L3 \times N)^2 \quad \text{[Expression 1]}$$
$$= 3.789 \times 10^{-8} \times f^4 \times (L1 \times L3 \times N)^2$$

Here, λ represents a wavelength, L1×L3 represents an area of the loop, N represents a winding number of the loop, and f represents frequency.

In order to derive the resistance of the portion of the radiation electrode 8, it is necessary to determine an electric current distribution on the radiation electrode 8, but it is assumed that the electric current distribution is uniform for convenience. Considering the skin effect of the electric current flowing along the conductor, the resistance component is derived from an expression shown in Expression 2.

$$Rm = \left\{(2 \times L1 + L3) \times \frac{1}{L2 \times \delta_s} + L3 \times \frac{1}{Wm \times \delta_s}\right\} \times \rho \quad \text{[Expression 2]}$$
$$= \left\{(2 \times L1 + L3) \times \frac{1}{L2} + L3 \times \frac{1}{Wm}\right\} \times \sqrt{\rho} \times 2 \times$$
$$\sqrt{\pi^2 \times f / 10}$$

Here, $\delta_S$ represents a skin depth, and ρ represents resistivity.

Then, the radiation efficiency η of the antenna 1 is given by dividing the radiation resistance Rr by the sum of the radiation resistance Rr, the conductor resistance Rm and the resistance component Rc of the frequency regulating capacitance 17, and therefore, derived from an expression shown in Expression 3.

$$\eta = \frac{Rr}{Rr + Rm + Rc} \quad \text{[Expression 3]}$$

From this result, it becomes apparent that it is possible to enhance the radiation efficiency η of the antenna 1 by increasing the radiation resistance Rr and decreasing the conductor resistance Rm.

Accordingly, in the shape and frequency band as shown in an example described later, the radiation resistance Rr is small as compared with the conductor resistance Rm, so that it can be said that the radiation efficiency η of the antenna 1 is approximately proportion to the radiation resistance Rr.

In this case, it is apparent that in order to increase the radiation resistance Rr, that is, in order to enhance the radiation efficiency η, an effect is obtained by squaring the area of the loop surface 9 and an effect is obtained by squaring the winding number of the loop.

That is to say, it is apparent that in order to enhance the radiation efficiency η of the antenna 1 by decreasing the conductor resistance Rm, it is effective to use a material of low resistivity for the radiation electrode 8, use a material that a resistance component of a capacitance is small, and shorten the length of the loop and broaden the width thereof.

In an actual design, it is necessary to take it into account that when the winding number N of the loop is increased, the electric length of the radiation electrode 8 is increased with the result that deviation from the assumption of the uniform electric current occurs, and moreover, frequency regulation by the frequency regulating capacitance 17 becomes difficult.

As a result of consideration of the above and the mechanical strength of the tire pressure information sending apparatus 19, it is possible to exemplify a design example of the antenna 1 (the radiation electrode 8) that is capable of making gain decrease due to the resistance component of the frequency regulating capacitance 17 low and is well balanced by configuring a loop antenna having a length of 40 mm, a height of 10 mm and a width of 20 mm with a double winding loop using a conductor having a width of 10 mm.

Besides, it is needless to say that in an actual design of the tire pressure information sending apparatus 19, in order to make the area of the loop surface 9 large, it is effective to adapt to the shape of the wheel rim 5, especially, the shape of the principal surface of the conductor portion.

As described above, the tire pressure information sending apparatus of the invention comprises, on the circuit board 4, the pressure sensor 2 for detecting the air pressure of the tire 20, the sending circuit 7 for sending the information on air pressure detected by the pressure sensor 2 by radio waves, and the radiation electrode 8 for sending the radio waves of the air pressure information, which radiation electrode 8 has the loop surface 9 substantially perpendicular to the principal surface of the circuit board 4.

According to the tire pressure information sending apparatus of the invention, the radiation electrode 8 has the loop surface 9 substantially perpendicular to the principal surface of the circuit board 4 as described above, so that it is possible to form the radiation electrode 8 into a wide plate-like shape, and consequently, it is possible to make the conductor resistance of the radiation electrode 8 small, and it is possible to enhance the radiation efficiency of the antenna.

The configurations and the like of the respective portions of the tire pressure information sending apparatus of the invention are as described above.

Then, to a wheel with a tire pressure information sending apparatus of the invention, is attached the tire pressure information sending apparatus having the configuration as described above so that the loop surface 9 of the radiation electrode 8 is substantially perpendicular to the principal surface of the conductor portion of the wheel to which the tire 20 is attached. Therefore, a magnetic field vector generated by the loop-shaped radiation electrode becomes substantially parallel to the principal surface of the conductor portion of the wheel, and consequently, a direction of a magnetic field vector by a mirror effect to the conductor portion of the wheel becomes the same as that of the magnetic field vector by the radiation electrode. Thereby, it is possible to effectively prevent that the antenna characteristics deteriorate at the time of attachment of the antenna to the wheel.

The invention is not limited to the above embodiments, and there is nothing against adding a variety of changes within the scope of the invention. For example, the radiation electrode may have a hole or a cut when necessary, and part of the radiation electrode may be bent. In this case, it is possible to effectively use a space inside a case of the apparatus and substantially increase the cross section of the loop surface of the antenna, so that it is possible to enhance the radiation efficiency of the antenna.

EXAMPLE

Figure 7A:
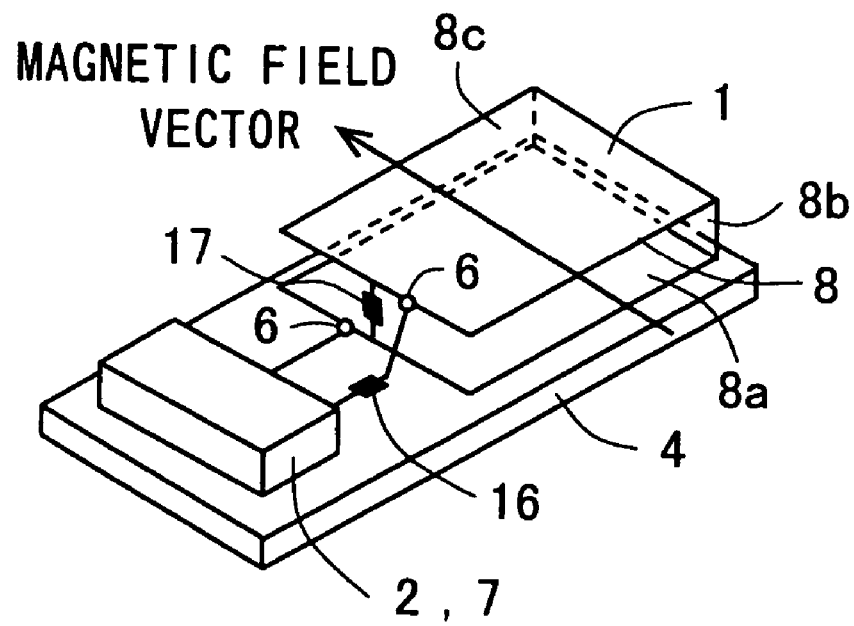
FIG. 7A is a perspective view showing an example of the tire pressure information sending apparatus of the invention.

An example of the tire pressure information sending apparatus using the tire pressure information sending apparatus antenna of the invention will be shown in FIG. 7A.

The tire pressure information sending apparatus comprises an antenna 1, a pressure sensor 2, a sending circuit 7, and a circuit board 4. The antenna 1 includes a radiation electrode 8 composed of a radiation electrode portion 8a disposed in parallel to the circuit board 4 which has a length of 40 mm, a width of 20 mm and a thickness of 1 mm, and made of a metallic plate having a length of 30 mm and a width of 20 mm, a radiation electrode portion 8b connected thereto, disposed perpendicularly from a substantially end portion of the circuit board 4 and made of a metallic plate having a height of 3 mm and a width of 20 mm, and a radiation electrode portion 8c connected thereto, disposed in parallel to the circuit board 4 and made of a metallic plate having a length of 30 mm and a width of 20 mm, which radiation electrode portions are formed into a U-letter shape. A chip capacitance of 18 pF is used as the frequency regulating capacitance 17 connecting end portions of the U-letter shape, that is, between an end of the radiation electrode portion 8a and an end of the radiation electrode portion 8c, a chip capacitance of 5 pF is used as the capacitance 16 connected to one feeding terminal of feeding terminals. An angle formed by the loop surface 9 and the circuit board in the antenna 1 is 90 degrees.

Figure 7B:
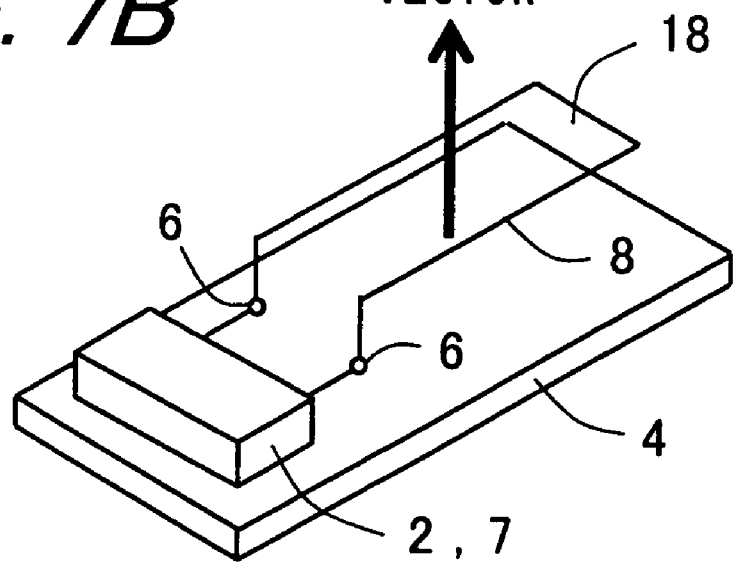
FIG. 7B is a perspective view showing an example of a conventional tire pressure information sending apparatus.
Figure 8A:
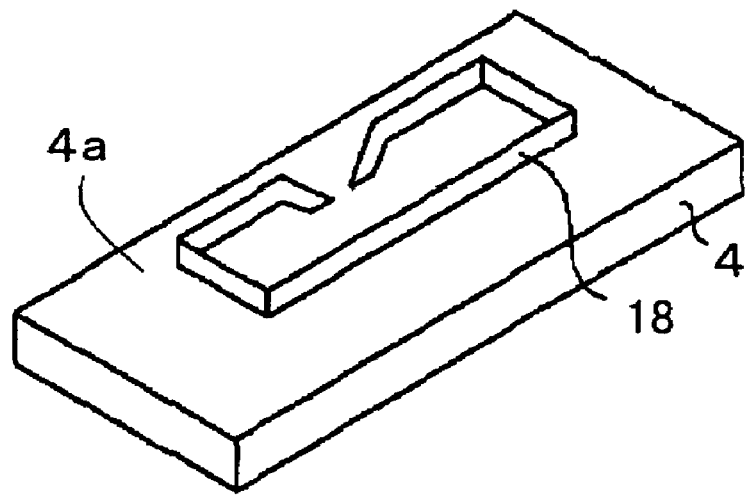
FIG. 8A is a perspective view showing a conventional tire pressure information sending apparatus.
Figure 8B:
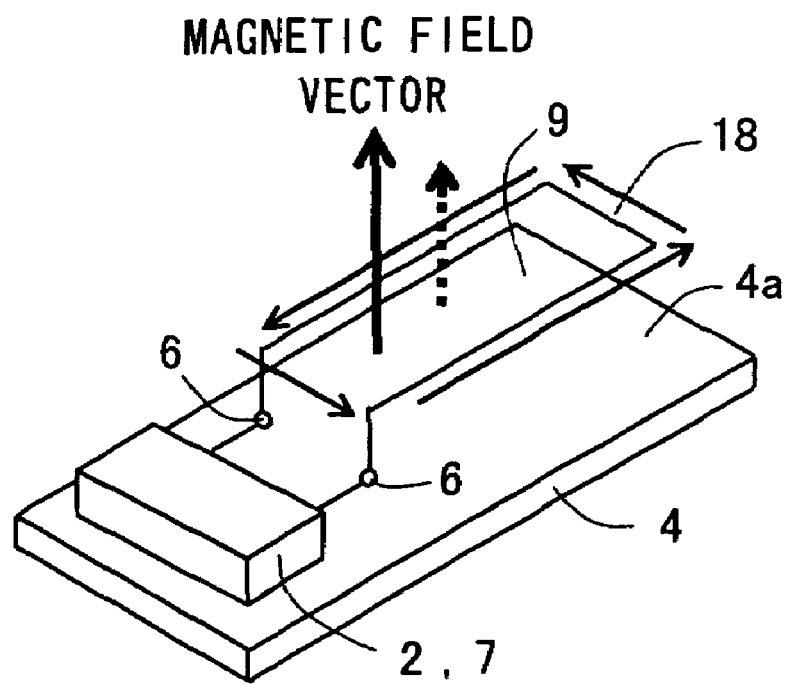
FIG. 8B is an explanation view showing a loop surface and a magnetic vector of FIG. 8A.

As a comparative example, a tire pressure information sending apparatus using a loop antenna 18 that is a conventional antenna for a tire pressure information sending apparatus will be shown in FIG. 7B.

In this comparative example, assuming the circuit board 4 has a length of 40 mm, a width of 20 mm and a thickness of 1 mm as in the above, and instead of the antenna 1, the loop antenna 18 is configured by the radiation electrode 8 made of a metallic wire on a surface parallel to the circuit board 4 at a height of 3 mm on the circuit board 4.

Then, radio waves of 315 MHz were sent from the antenna 1 of the example of the invention and the loop antenna 18 of the comparative example, respectively, and the radiation efficiencies thereof were compared.

As a result, when the apparatuses were not attached to the wheel rims, the radiation efficiencies were equally 4% in both the configurations, but when attached to the wheel rims, the radiation efficiency was enhanced to 6% in the example of the invention, whereas the radiation efficiency deteriorated to 0.3% in the comparative example. From this result, it is apparent that the antenna characteristics were enhanced by attaching the circuit board 4 so that the principal surface thereof becomes substantially parallel to the wheel rim, and using the antenna 1 provided with the radiation electrode 8 having the loop surface substantially perpendicular to the principal surface of the circuit board 4.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An antenna for a tire pressure information sending apparatus comprising:
   a circuit board provided with feeding electrodes;
   a pressure sensor placed on the circuit board, for detecting air pressure of a tire;
   a sending circuit placed on the circuit board, for sending information on the air pressure detected by the pressure sensor by radio waves; and
   a radiation electrode placed on a principal surface of the circuit board, having a loop surface substantially perpendicular to the principal surface, the radiation electrode sending air pressure information of a tire by radio waves,
   wherein the pressure sensor and the sending circuit are arranged within the loop surface.

2. The antenna of claim 1, wherein a dielectric substance or a magnetic substance is disposed within the loop surface.

3. The antenna of claim 2, wherein a battery cell is attached within the loop surface.

4. The antenna of claim 1, wherein a battery cell is attached within the loop surface.

5. A tire pressure information sending apparatus comprising:
   the antenna for the tire pressure information sending apparatus of claim 1,
   further comprising, on the circuit board, a pressure sensor for detecting the air pressure information of the tire, the antenna being attached to the tire pressure information sending apparatus so that the loop surface is substantially perpendicular to a wheel rim of the tire.

6. The tire pressure information sending apparatus of claim 5, wherein one end of the radiation electrode is used as a grounding conductor or a power source conductor.

7. The antenna of claim 1, wherein the circuit board is formed in a rectangular shape, and the loop surface extends along a longitudinal direction of the circuit board.

8. A tire pressure information sending apparatus comprising:
   a circuit board;
   a pressure sensor placed on the circuit board, for detecting air pressure of a tire;
   a sending circuit placed on the circuit board, for sending information on the air pressure detected by the pressure sensor by radio waves; and
   a radiation electrode placed on the circuit board, for sending the radio waves, the radiation electrode having a loop surface substantially perpendicular to a principal surface of the circuit board,
   wherein the pressure sensor and the sending circuit are arranged within the loop surface.

9. The tire pressure information sending apparatus of claim 8, wherein the pressure sensor and the sending circuit are arranged within the loop surface.

10. A wheel with the tire pressure information sending apparatus of claim 8 attached thereto so that the loop surface is substantially perpendicular to a principal surface of a conductor portion of the wheel to which the tire is attached.

11. The tire pressure information sending apparatus of claim 8, wherein the circuit board is formed in a rectangular shape, arid the loop surface extends along a longitudinal direction of the circuit board.

12. An antenna for a tire pressure information sending apparatus comprising:
   a circuit board provided with feeding electrodes;
   a pressure sensor placed on the circuit board, for detecting air pressure of a tire;
   a sending circuit placed on the circuit board, for sending information on the air pressure detected by the pressure sensor by radio waves; and
   a radiation electrode having a loop surface substantially perpendicular to a principal surface of the circuit board, the radiation electrode sending air pressure information of a tire onto the principal surface by radio waves,
   wherein a magnetic field vector is parallel to the circuit board, and
   wherein the pressure sensor and the sending circuit are arranged within the loop surface.

13. The antenna of claim 12, wherein the circuit board is formed in a rectangular shape, and the loop surface extends along a longitudinal direction of the circuit board.

14. A tire pressure information sending apparatus comprising:
   a circuit board;
   a pressure sensor placed on the circuit board, for detecting air pressure of a tire;
   a sending circuit placed on the circuit board, for sending information on the air pressure detected by the pressure sensor by radio waves; and
   a radiation electrode placed on the circuit board, for sending the radio waves, the radiation electrode having a loop surface substantially perpendicular to a principal surface of the circuit board,
   wherein a magnetic field vector is parallel to the circuit board, and
   wherein the pressure sensor and the sending circuit are arranged within the loop surface.

15. The tire pressure information sending apparatus of claim 14, wherein the circuit board is formed in a rectangular shape, and the loop surface extends along a longitudinal direction of the circuit board.

* * * * *